Patented Oct. 12, 1926.

1,603,109

UNITED STATES PATENT OFFICE.

ALBERT C. HOLZAPFEL, OF NEW YORK, N. Y.

COMPOSITION FOR PRESERVING WOOD.

No Drawing.  Application filed April 15, 1925. Serial No. 23,430.

This invention relates to compositions for treating wood and more particularly to a composition for preserving wood against the action of the teredo worm, and other marine borers, fungi, and the like.

In the present invention, I provide a composition with which wood is impregnated for preserving and which consists of mercurial and zinc preparations dissolved in residual oil obtained by the distillation of crude petroleum which will act at the same time as a solvent and a waterproofing and preservative for the wood.

An object of the invention is to provide a mercurial preparation freely soluble in fuel oil and to obtain this result, oxide of mercury is dissolved under heat in a material known as "varnish fumes", which consists of the condensed fumes derived from copal and other hard gums obtained by condensation during the melting process of such gums. In addition to the oxide of mercury, I may also employ stearate of zinc which is formed by dissolving zinc oxide in stearic acid under heat. This material is readily soluble in fuel oil and both of the solutions have powerful antiseptic and toxic properties.

In making the composition suitable for use in treating wood for preserving it, substantially three parts of oxide of mercury are dissolved in six parts of varnish fumes to which is subsequently added sufficient fuel oil to keep the material in solution. The zinc stearate, prepared in the manner set forth above, is then dissolved in fuel oil, from three to ten parts of the zinc stearate being employed. The fuel oil solutions of oxide of mercury and zinc stearate are mixed, producing a concentrated solution. When the solution is to be used, sufficient fuel oil is added so as to provide a final product having from one to five parts of the oxide of mercury and from one to five parts of zinc stearate to one thousand parts of fuel oil.

As stated, the solution of oxide of mercury in varnish fumes may be added to the fuel oil and used for preserving without the addition of the stearate of zinc.

In impregnating piles, railroad ties, telegraph poles or wood used for structural purposes in tropical climates, I may employ either the regular creosoting tanks and place the wood to be treated, with a sufficient amount of the prepared composition, in the tank and heat to a temperature of 110° C., or the wood to be impregnated may be heated in a kiln to a temperature of from 100 to 115° C., and after so heating it several hours, the wood is immersed in the preservative solution at a normal temperature. During the heating period, the moisture in the outer structure of the wood evaporates and the gases therein expand. When the heated wood is immersed in the cooler preservative solution, the gases and air in the structure of the wood contract and the solution is absorbed in the wood.

While the oxide of mercury dissolved in the varnish fumes and then dissolved in fuel oil may be employed separately as stated, I prefer to use the mixture of oxide of mercury and zinc stearate in a solution of fuel oil in substantially the proportions set forth above.

In the claims, the term "fuel oil" is used to mean residual oil obtained in the distillation of crude petroleum and having a high boiling point. The term "varnish fumes" is employed to designate the condensed fumes obtained from copal and other hard gums during the melting process of such gums.

While I have described in detail the preferred practice of my process, it is to be understood that the details of procedure may be widely varied without departing from the spirit of the invention or the scope of the subjoined claims.

I claim:—

1. A preserving composition comprising a mercurial compound dissolved in varnish fumes.

2. A preserving composition comprising a fuel oil solution of a mercurial compound dissolved in varnish fumes.

3. A preserving composition comprising a fuel oil solution of oxide of mercury dissolved in varnish fumes.

4. A preserving composition comprising substantially three parts of oxide of mercury dissolved in substantially six parts of varnish fumes and then dissolved in fuel oil.

5. A preserving composition comprising a fuel oil solution of a mercurial compound dissolved in varnish fumes, and zinc stearate.

6. A preserving composition comprising a fuel oil solution of substantially three parts of oxide of mercury dissolved in substantially six parts of varnish fumes, and from three to ten parts of zinc stearate.

7. A preserving composition comprising substantially one thousand parts of fuel oil, one to five parts of oxide of mercury dissolved in varnish fumes, and from one to five parts of zinc stearate.

In testimony whereof, I affix my signature.

ALBERT C. HOLZAPFEL.